(12) United States Patent
Beyfuss et al.

(10) Patent No.: US 8,485,731 B2
(45) Date of Patent: Jul. 16, 2013

(54) BEARING SUPPORT

(75) Inventors: Berthold Beyfuss, Kaisten (DE);
Burkhard Buchheim, Schweinfurt (DE); Alexander Dilje, Schweinfurt (DE); Hans-Jürgen Friedrich, Königsberg (DE); Helmut Hauck, Euerbach (DE); Holger Kristandt, Euerbach (DE); Alfred Radina, Massbach (DE); Jonas Schierling, Hassfurt (DE)

(73) Assignee: Aktiebolaget SKF, Göteborg (SE)

( * ) Notice: Subject to any disclaimer, the term of this patent is extended or adjusted under 35 U.S.C. 154(b) by 235 days.

(21) Appl. No.: 13/061,537

(22) PCT Filed: Sep. 1, 2009

(86) PCT No.: PCT/EP2009/006306
§ 371 (c)(1),
(2), (4) Date: May 26, 2011

(87) PCT Pub. No.: WO2010/025885
PCT Pub. Date: Mar. 11, 2010

(65) Prior Publication Data
US 2011/0222808 A1   Sep. 15, 2011

(30) Foreign Application Priority Data
Sep. 3, 2008  (DE) .......................... 10 2008 045 495

(51) Int. Cl.
*F16C 35/06* (2006.01)
(52) U.S. Cl.
USPC ....................................... 384/537

(58) Field of Classification Search
USPC .................. 384/537, 561, 584, 585, 903, 551
See application file for complete search history.

(56) References Cited

U.S. PATENT DOCUMENTS

| | | | | |
|---|---|---|---|---|
| 6,106,155 A * | 8/2000 | Beyfuss et al. | ............... | 384/537 |
| 6,279,231 B1 * | 8/2001 | Beyfuss et al. | ............ | 29/898.07 |
| 6,506,038 B2 * | 1/2003 | Sjoholm et al. | ............... | 384/537 |
| 6,652,150 B2 * | 11/2003 | Buchheim et al. | ........... | 384/537 |
| 2011/0211782 A1 * | 9/2011 | Beyfuss et al. | ............... | 384/428 |

FOREIGN PATENT DOCUMENTS

| | | |
|---|---|---|
| DE | 965893 C | 6/1957 |
| DE | 2460448 A1 | 6/1976 |
| DE | 29802228 U1 | 3/1998 |
| DE | 19937396 A1 | 3/2001 |
| DE | 2003194037 A | 7/2003 |
| DE | 10220009 A1 | 11/2003 |
| DE | 102004003662 B3 | 4/2005 |
| DE | 102004038952 A1 | 3/2006 |
| DE | 102006034921 A1 | 1/2008 |
| DE | 102007040460 A1 | 2/2009 |

* cited by examiner

*Primary Examiner* — Thomas R Hannon
(74) *Attorney, Agent, or Firm* — Mark A. Ussai; Bryan Peckjian

(57) ABSTRACT

A bearing support is configured to retain at least two bearings disposed closely adjacent to each other in a parallel relationship. Each bearing includes a bearing outer ring having a cylindrical outer circumferential surface. The bearing support comprises at least first and second portions that are connected together. The first portion is formed as a component that has cylindrical openings configured to receive or seat the respective bearing outer rings and to surround the entire circumference of the respective bearing outer ring. The second portion is formed as a support plate. A bearing assembly includes the bearing support with a bearing seated in each of the respective cylindrical openings.

20 Claims, 5 Drawing Sheets

BEARING SUPPORT

CROSS-REFERENCE

This application is the U.S. national stage of International Application No. PCT/EP2009/006306 filed on Sep. 1, 2009, which claims priority to German patent application no. 10 2008 045 495.8 filed on Sep. 3, 2008.

TECHNICAL FIELD

The invention relates to a bearing support for retaining at least two adjacently-disposed bearings, wherein the rotational axes of the at least two bearings are parallel and spaced relative to one another and wherein each bearing includes a bearing outer ring having a cylindrical circumferential surface.

RELATED ART

Bearing supports of this type are known in various designs in the prior art. For example, DE 298 02 228 U1 shows a bearing support in the shape of a planar plate, in which pot-shaped recesses are formed by a deep drawing process; the recesses form a cylindrical seating surface for a roller bearing. Then the outer rings of the roller bearing are pressed into the recesses. In this way, it is possible to support two roller bearings close to one another with their rotational axes oriented parallel to one another. For example, such a bearing assembly is required in transmission gears when two gear shafts must be supported close to one another.

The bearing support is manufactured from a steel plate, mostly for cost reasons. Due to the geometrical relationships, the entire circumference of the abutment surface of the bearing seat is not available when the bearings move closer and closer together. Moreover, a spandrel-like imperfection is created at the point where the bearings are the closest to one another, which imperfection does not facilitate a radial support of the bearing. In case of closely-adjacent bearings, it is also disadvantageous that the bearing support does not provide a completely-enclosed radial bearing guide in the area of the bearing seat. A 360° encircling support of the bearing does not result in the radial direction, because the small axial spacing and the manufacturing process of the bearing support (in most cases, by deep-drawing) cannot realize it. Consequently, high shape- and positional imprecisions of the bearing seat are possible in the bearing support, which can adversely affect the useful life of the bearing. Depending on the application, in case a complete radial support of the bearing is required, it cannot be ensured by known bearing supports. The current trend towards minimizing the installation space leads to axial spacings that, in case of deep-drawn recesses of a bearing support, do not allow for a 360° encircling bearing seat.

SUMMARY

In one aspect of the present teachings, an improved bearing support is disclosed, which may overcome one or the above-mentioned disadvantages. In such embodiments of the present teachings, the bearing support can be manufactured in a simple, reliable and/or cost-efficient manner. In addition or in the alternative, a stable radial guidance of the bearing is also possible over the entire circumference of the bearing outer ring, which is especially advantageous when bearings are disposed closely together.

In another aspect of the present teachings, a bearing support is comprised of at least two portions, wherein the first portion is formed as a component having cylindrical openings for receiving or seating the circumferential surfaces of the bearing outer rings at least across a portion of the width (depth) of the bearing outer rings and around the entire circumference of the bearing outer rings, the second portion is formed as a support plate and the two portions of the bearings support are connected with one another.

The first portion of the bearing support is preferably formed as a one-piece component.

Alternatively, it is also possible to form the first portion of the bearing support using multiple layers, which are stacked one on top of another and have an identical shape. The advantage of this solution is that, in case the first portion is manufactured by stamping, thinner sheets can be produced more precisely and simply. Preferably, the stacked layers are formed in a planar manner; as mentioned above, they are preferably produced by using a stamping process.

The stacked layers can be also connected with one another. This connection can be produced by a material bonding connection, for example, by welding or soldering.

As viewed in the direction of the rotational axes of the bearings, the first portion of the bearing support preferably has the shape of an eight (in the case of two bearings to be supported).

The connection between the first and the second portion of the bearing support can be produced by a material bonding connection, in particular by welding.

In addition or in the alternative, this connection can be also produced by an interlocking-fit, for example, by inserting at least one clip ring so as to retain the first portion on the bearing outer ring. In this case, the at least one clip ring is preferably disposed in a lateral end portion of the bearing support, so that the clip ring contacts an end side of the bearing ring and is disposed in a groove in the circumferential surface of the bearing outer ring. Furthermore, it is particularly preferred that one clip ring is disposed on or in each lateral end portion of the bearing support.

The second portion of the bearing support can have pot-shaped recesses for receiving the first portion of the bearing support, into which the first portion is inserted.

Alternatively, it is also possible that one of the axial ends of the first portion of the bearing support sits on the second portion of the bearing support and the two portions are connected with each other at the meeting point.

The second portion of the bearing support is preferably comprised of sintered metal or cast metal, as long as a stamped part is not preferred.

The invention thus provides a closed insert and/or a closed support (first portion of the bearing support), which can be solidly formed or constructed from multiple layers. Using the insert, it is ensured that, although the bearing outer ring is not necessarily supported across its entire width, it is supported around its entire circumference. A lack of support in the area of the closest adjacency of the two bearings is therefore prevented; a deep-drawn support plate with pot-shaped recesses cannot provide such support for the bearings according to the prior art. The insert is connected with a support plate (second portion of the bearing support), which is disposed on a further machine part, e.g., on a transmission housing.

With the inventive proposal, it is possible in an advantageous way to integrate a complete, i.e. 360° encircling, radial support of the bearing into the bearing support and/or the bearing support component. As a result, an improved roundness of the bearing track results and thus a longer useful life of the bearing.

The first portion of the bearing support (insert, support) can be manufactured, e.g., by a sintering process, a stamping process or a casting process. The first portion can be either inserted into a support plate with recesses provided for the first portion or it itself can serve as a supporting element for the bearing, wherein in this case the second portion of the bearing support, in effect, represents a flange, with which the first portion is connected. The first portion can be connected with the second portion using known methods, which methods are based on an interlocking-fit, a material bonding connection and/or a friction-fit.

The proposed solution is preferably utilized in transmissions, wherein automobile transmissions, in particular, come into consideration. However, the proposed solution can also be utilized in other applications, in which two bearings must be supported close to one another.

Exemplary embodiments of the invention are illustrated in the drawings.

DETAILED DESCRIPTION OF THE INVENTION

Figure 1:
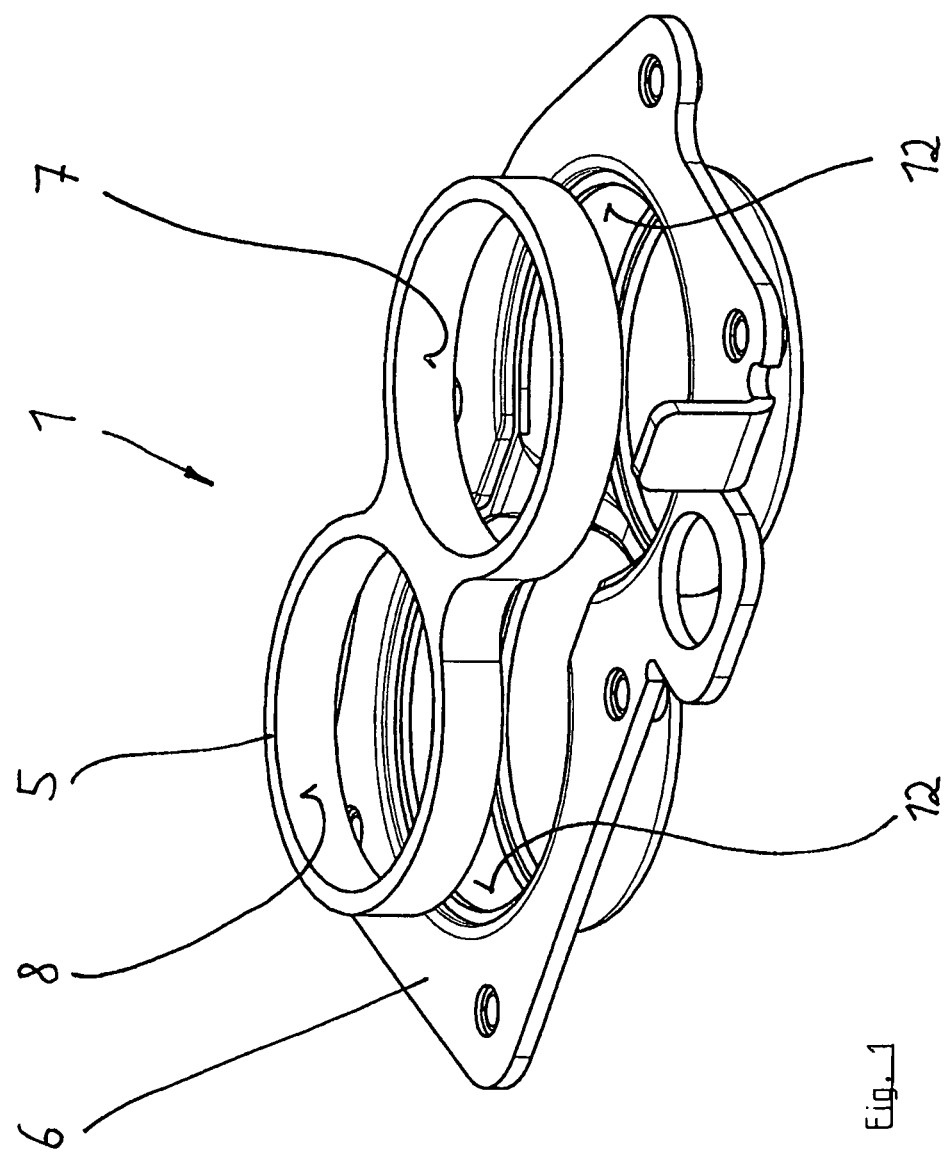
FIG. 1 shows a bearing support comprised of two portions for two (not illustrated) bearings in an exploded diagram.

In FIG. 1, a bearing support 1 is illustrated, which is intended to support two (not illustrated) closely-spaced roller bearings having rotational axes that are oriented so as to be parallel to one another. Such an assembly is typical for an automobile transmission, in which two closely-spaced shafts must be supported so as to be parallel to one another. The bearings support 1 is comprised of two portions 5 and 6. The first portion 5 of the bearing support is designed as an insert and has the shape of an eight. It is important is that the first portion 5 has—in the present case—two openings 7 and 8, which openings extend completely around 360°, i.e. they provide a completely radially-encircling support for the bearing outer rings to be inserted. The second portion 6 of the bearing support is produced from a thin steel plate and has a double pot-shaped recess 12 for the first portion 5, which recesses 12 are produced in a deep-drawing process. As a result, the first portion 5 can be inserted into the recesses 12. In the inserted position, the first portion 5 is connected with the second portion 6. This can take place by a friction-fit or an interlocking-fit or a material bonding connection. In the present case, the recesses 12 have such a fit relative to the outer circumference of the first portion 5 that the portion 5 sits with a press-fit in the recesses when it has been pressed into these recesses. In the alternative or in addition, however, it is also possible that a material bonding connection or an interlocking-fit connection is produced between the portions 5, 6, e.g., by welding.

Figure 2:
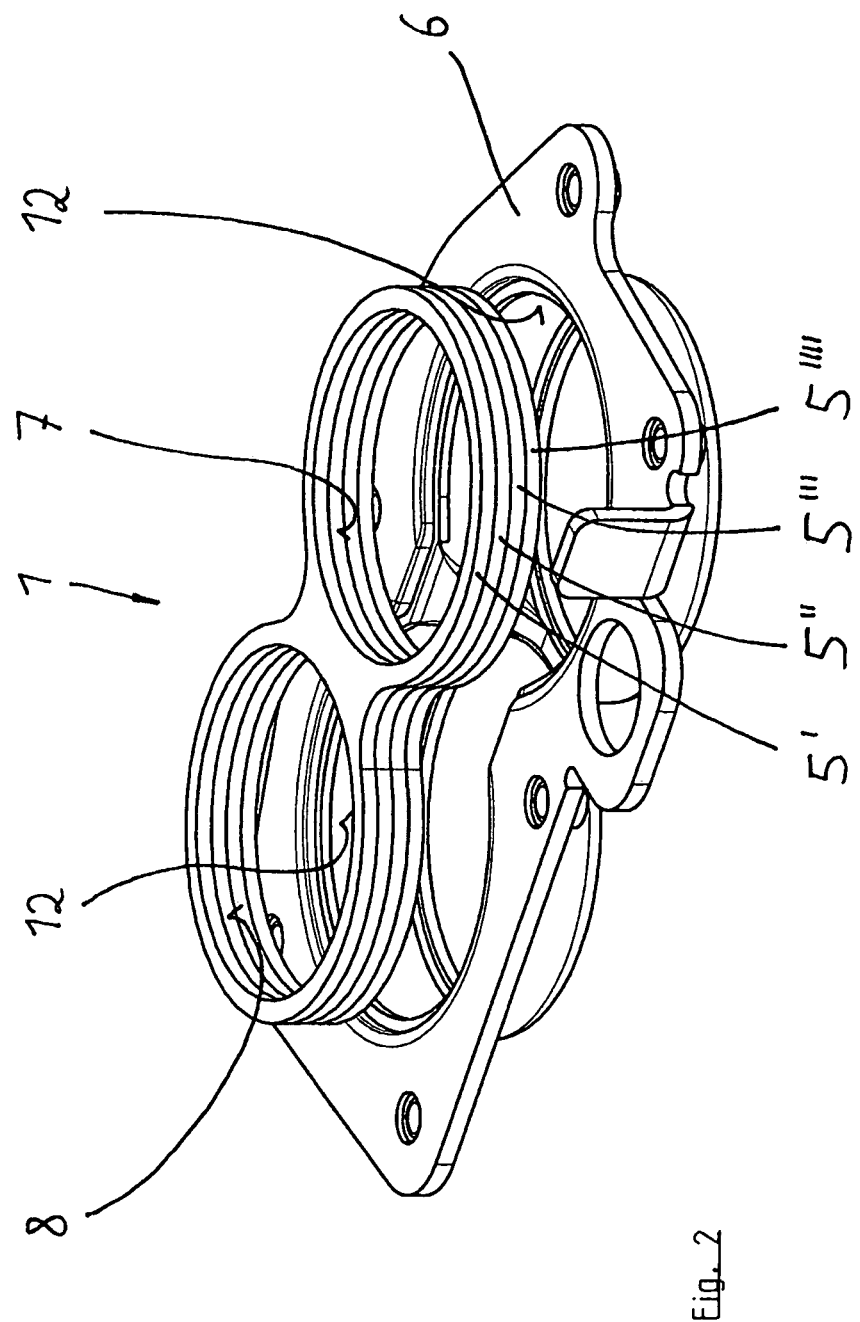
FIG. 2 shows an alternative embodiment of the bearing support according to FIG. 1 with the first portion constructed in layers.

The solution according to FIG. 2 differs from the one according to FIG. 1 in that the first portion 5, i.e. the insert and/or the retainer of the bearing, is comprised of multiple— in the present case four—plate-shaped layers 5', 5'', 5''' and 5'''', which layers are stacked and are in turn connected with the second portion 6 by an interlocking-fit, a material bonding connection or a friction-fit. Therefore, the four layers and/or individual portions 5', 5'', 5''', 5'''' of the portion 5 can be connected with each other so as to be one under another, e.g., by soldering or welding.

Figure 3:
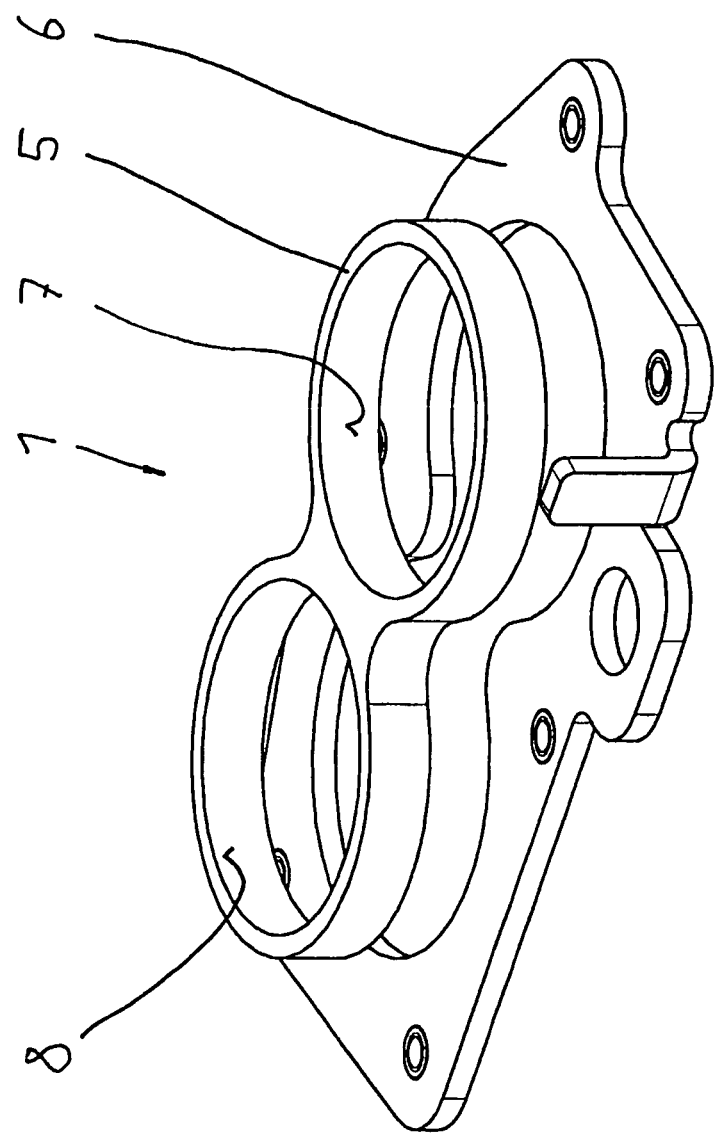
FIG. 3 shows another alternative embodiment of the bearing support according to FIG. 1 with the first portion being formed as one-piece.

The solution according to FIG. 3 shows an alternative design of the bearing support 1. It is designed similar to the solution according to FIG. 1. However, the second portion 6 no longer has pot-shaped recesses for receiving the first portion 5. Moreover, one of the axial ends of the first portion 5 sits on the second portion 6 and is then connected therewith, e.g., welded with it. Laser beam welding is preferred for this purpose.

Figure 4:
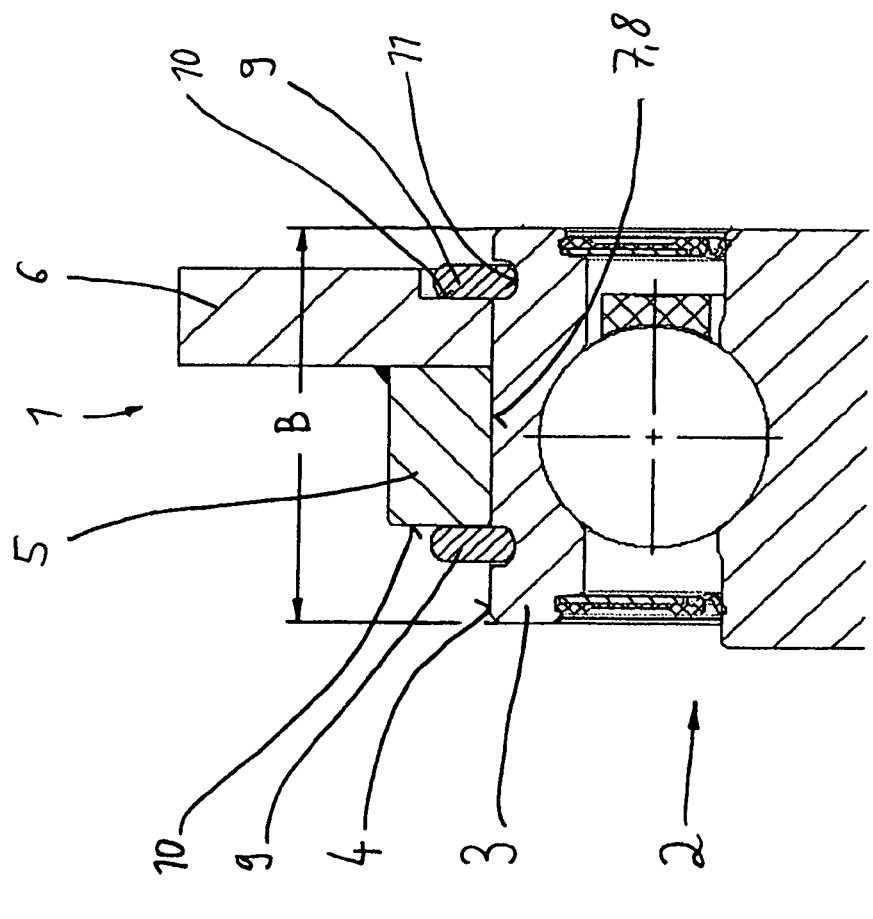
FIG. 4 shows a portion of a radial cross-section of a bearing support according to FIG. 3 with an installed bearing and FIG. 5 shows a portion of a radial section of a bearing support according to another alternative embodiment of the bearing support.

In FIG. 4, the bearing support assembly according to FIG. 3 is illustrated in a radial cross-section. Here it can be seen how a bearing outer ring 3 of a bearing 2 is connected with the bearing support 1. The bearing outer ring 3 of the bearing 2 is inserted into the openings 7 or 8 of the bearing support 1 so that the outer circumferential surface 4 of the bearing outer ring 3 abuts on the cylindrical seating surface of the opening. As can be seen, the width B of the bearing outer ring 3 is thus wider than the width of the first portion 5 of the bearing support; however, the bearing outer ring 3 is completely circumferentially enclosed by the first portion 5 of the bearing support 1 and, as a result, is radially supported around the entire circumference.

Here, the bearing outer ring 3 is fixed in the bearing support 1 by clip rings 9 that are inserted into respective grooves 11 (annular grooves) defined in the outer circumferential surface 4 of the bearing outer ring 3. The clip rings 9 contact the bearing support 1 on both end sides 10, wherein the left end side 10 is directly contacted in FIG. 4, whereas the right end side 10 is formed by a groove in the second portion 6.

In FIG. 4, it is indicated that the two portions 5 and 6 are connected with one another by a welded connection. It is also possible, however, that a clamping force is generated between the two portions 5 and 6 during the installation of the clip rings 9 so that a friction-fit connection of the two portions 5 and 6 is effected.

Figure 5:
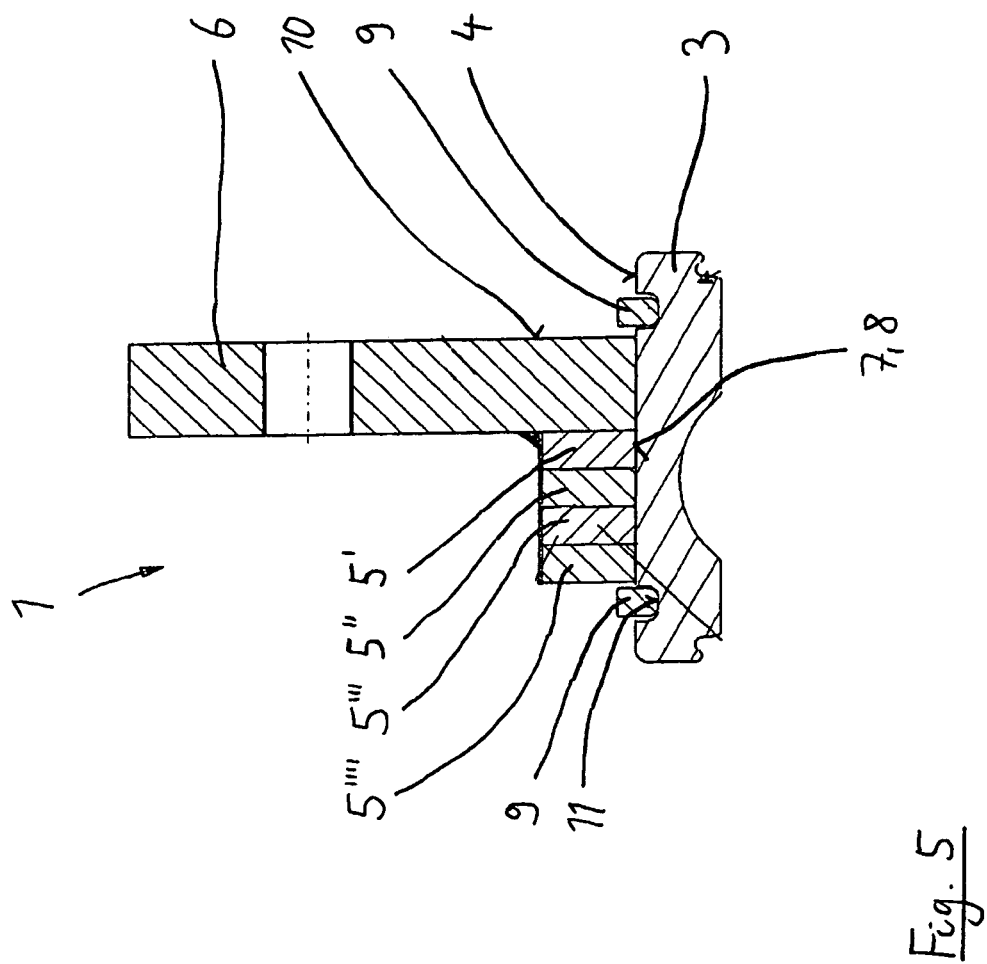

FIG. 5 shows a similar solution, wherein here the first portion 5 is again formed from multiple (four) layers 5', 5'', 5''', 5''''. In addition, the bearing outer ring 3 is again fixed in the bearing support 1 by clip rings 9. Here it is indicated that the four layers 5', 5'', 5''' and 5'''' are connected with one another by a soldering or welding process and that the resulting first portion 5 is then welded or soldered with the second portion 6.

Further, it can be seen that clip rings 9 leave an axial clearance remaining between them and the bearing support 1. This is in no way disadvantageous for many utilizations (namely, in the case of a floating bearing).

REFERENCE NUMBER LIST 1 bearing support
2 bearing (roller bearing)
3 bearing outer ring
4 circumferential surface
5 portion of the bearing support (insert)
5' layer
5'' layer
5''' layer
5'''' layer
6 portion of the bearing support (support plate)
7 opening 8 opening
9 clip ring
10 end side
11 groove
12 pot-shaped recess
B width of the bearing outer ring

The invention claimed is:

1. A bearing support configured to retain at least two adjacently-disposed bearings, wherein respective rotational axes of the at least two bearings are parallel and each bearing includes a bearing outer ring having a cylindrical outer circumferential surface, the bearing support comprising:
   a first portion having at least two cylindrical-shaped openings configured to receive the respective bearing outer rings such that, when the bearing outer rings are inserted into the respective openings, a circumferential inner surface of each opening covers at least a part of a width of the bearing outer ring received therein and surrounds an entire circumference of the bearing outer ring received therein, wherein the first portion is formed from a plurality of stacked layers, each having an identical shape, and
   a second portion formed as a bearing support plate, the first and second portions being connected with one another.

2. A bearing support according to claim 1, wherein each of the stacked layers is planar.

3. A bearing support according to claim 2, wherein the stacked layers are produced by stamping.

4. A bearing support according to claim 2, wherein the stacked layers are connected with one another by one of welding and soldering.

5. A bearing support according to claim 4, wherein the first portion generally has a shape of a figure eight as viewed in the direction of the rotational axes of the bearings.

6. A bearing support according to claim 5, wherein the first portion is connected to the second portion by one of welding and soldering.

7. A bearing support according to claim 5, further comprising at least one clip ring retaining the first portion relative to the second portion.

8. A bearing support according to claim 7, wherein the at least one clip ring is disposed in a lateral end area of the bearing support, the at least one clip ring contacts the bearing support on an end side and the at least one clip ring is disposed in a groove defined in the outer circumferential surface of the bearing outer ring.

9. A bearing support according to claim 8, wherein at least one clip ring is disposed in each lateral end area of the bearing support so as to retain the first and second portions therebetween.

10. A bearing support according to claim 9, wherein the second portion of the bearing support has at least substantially cylindrically-shaped recesses configured to receive the first portion therein.

11. A bearing support according to claim 10, wherein one axial end of the first portion sits on the second portion and the first and second portions are welded at the point(s) of contact of the first and second portions.

12. A bearing support according to claim 11, wherein the second portion is comprised of one of sintered metal and cast metal.

13. A bearing assembly comprising:
   the bearing support of claim 12 having first and second cylindrical-shaped openings,
   a first bearing having a first bearing outer ring press-fit in the first cylindrical-shaped opening, and
   a second bearing having a second bearing outer ring press-fit in the second cylindrical-shaped opening.

14. A bearing support according to claim 1, wherein one axial end of the first portion sits on the second portion and the first and second portions are welded at the point of contact of the first and second portions.

15. A bearing support according to claim 1, wherein at least one clip ring is disposed in a lateral end area of the bearing support, the at least one clip ring contacts the bearing support on an end side and the at least one clip ring is disposed in a groove defined in the outer circumferential surface of the bearing outer ring.

16. A bearing support according to claim 15, wherein at least one clip ring is disposed in each lateral end area of the bearing support so as to retain the first and second portions therebetween.

17. A bearing support according to claim 1, wherein the first portion generally has a shape of a figure eight in a top view.

18. A bearing support according to claim 1, wherein the stacked layers are connected with one another by one of welding and soldering.

19. A bearing support comprising:
   a first portion having at least first and second cylindrical-shaped openings, each configured to receive and entirely surround an outer circumference of an outer ring of a bearing, wherein the at least first and second cylindrical-shaped openings are further configured to retain at least two bearings in a parallel relationship and wherein the first portion comprises a plurality of stacked layers, each having an identical shape and being connected to each other, and
   a second portion formed as a bearing support plate, the first and second portions being connected with one another.

20. A bearing assembly comprising:
   the bearing support of claim 19,
   a first bearing having a first bearing outer ring seated in the first cylindrical-shaped opening such that the first cylindrical-shaped opening entirely surrounds an outer circumferential surface of the first bearing outer ring, and
   a second bearing having a second bearing outer ring seated in the second cylindrical-shaped opening such that the second cylindrical-shaped opening entirely surrounds an outer circumferential surface of the second bearing outer ring,
   wherein the first portion has a substantially figure eight shape, the stacked layers are each planar and are welded or soldered together, and the first portion is welded or soldered to the second portion.

* * * * *